(12) United States Patent
Kawai et al.

(10) Patent No.: US 10,011,261 B2
(45) Date of Patent: Jul. 3, 2018

(54) CONTROL APPARATUS FOR HYBRID VEHICLE

(71) Applicant: TOYOTA JIDOSHA KABUSHIKI KAISHA, Toyota-shi (JP)

(72) Inventors: Takashi Kawai, Gotemba (JP); Yasuhiro Oshiumi, Gotemba (JP); Hideaki Komada, Gotemba (JP); Yosuke Suzuki, Susono (JP); Hirotatsu Kitabatake, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 523 days.

(21) Appl. No.: 14/440,178

(22) PCT Filed: Nov. 27, 2012

(86) PCT No.: PCT/JP2012/080629
§ 371 (c)(1),
(2) Date: May 1, 2015

(87) PCT Pub. No.: WO2014/083616
PCT Pub. Date: Jun. 5, 2014

(65) Prior Publication Data
US 2015/0283992 A1    Oct. 8, 2015

(51) Int. Cl.
*B60W 20/00* (2016.01)
*B60K 6/383* (2007.10)
(Continued)

(52) U.S. Cl.
CPC ............ *B60W 20/00* (2013.01); *B60K 6/365* (2013.01); *B60K 6/383* (2013.01); *B60K 6/445* (2013.01);
(Continued)

(58) Field of Classification Search
CPC ...... B60W 20/00; B60W 10/30; B60W 10/08; F16H 57/043; F16H 57/0482; F16H 57/0484; F16H 57/0409; F16H 3/727
See application file for complete search history.

(56) References Cited

U.S. PATENT DOCUMENTS

| | | | |
|---|---|---|---|
| 7,878,305 B2 * | 2/2011 | Diosi | F16C 3/02 123/196 R |
| 7,944,106 B2 * | 5/2011 | Miller | B60K 6/26 310/112 |
| 8,827,854 B2 * | 9/2014 | Nomura | F16H 57/0428 475/170 |

FOREIGN PATENT DOCUMENTS

| | | |
|---|---|---|
| JP | 2005 81930 | 3/2005 |
| JP | 2010 203588 | 9/2010 |

OTHER PUBLICATIONS

International Search Report dated Jan. 29, 2013 in PCT/JP2012/080629 Filed Nov. 27, 2012.

\* cited by examiner

*Primary Examiner* — Erin D Bishop
(74) *Attorney, Agent, or Firm* — Oblon, McClelland, Maier & Neustadt, L.L.P.

(57) ABSTRACT

A control apparatus for controlling a hybrid vehicle having a planetary gear train including a first gear coupled to a first rotating electrical machine, a carrier coupled to an input shaft having an ejecting hole, the input shaft being coupled to an engine shaft of an engine via a torque limiting mechanism which allows the input shaft to skid against the engine shaft depending on a variation of torque between the input shaft and the engine shaft, and a second gear coupled to a drive shaft which is coupled to a second rotating electrical machine, and a rotation limiting mechanism which prevents the engine shaft from rotating in another direction, (Continued)

drives the first rotating electrical machine to output torque for rotating the input shaft in the another direction when the ejecting hole with the engine stopped does not extend in a predetermined direction in which the ejecting hole can eject oil to a mechanism portion of the planetary gear train which locates vertically above the input shaft.

4 Claims, 7 Drawing Sheets

(51) Int. Cl.
*B60K 6/445* (2007.10)
*B60W 10/08* (2006.01)
*F16H 57/04* (2010.01)
*B60K 6/365* (2007.10)
*B60W 10/30* (2006.01)
*F16H 3/72* (2006.01)
*F16H 37/08* (2006.01)

(52) U.S. Cl.
CPC ............ *B60W 10/08* (2013.01); *B60W 10/30* (2013.01); *F16H 3/727* (2013.01); *F16H 57/043* (2013.01); *F16H 57/0409* (2013.01); *F16H 57/0482* (2013.01); *B60W 2510/083* (2013.01); *B60W 2710/30* (2013.01); *B60Y 2306/03* (2013.01); *F16H 57/0484* (2013.01); *F16H 2037/0866* (2013.01); *Y02T 10/6239* (2013.01); *Y10S 903/91* (2013.01); *Y10S 903/93* (2013.01)

[FIG. 1]
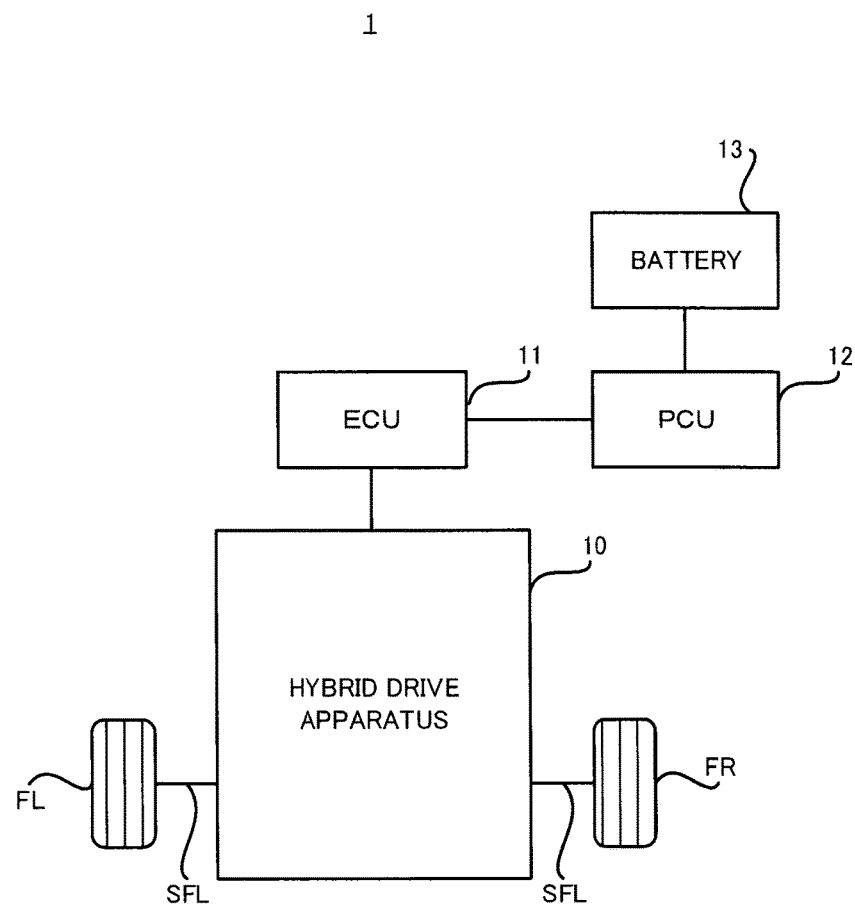

[FIG. 2]
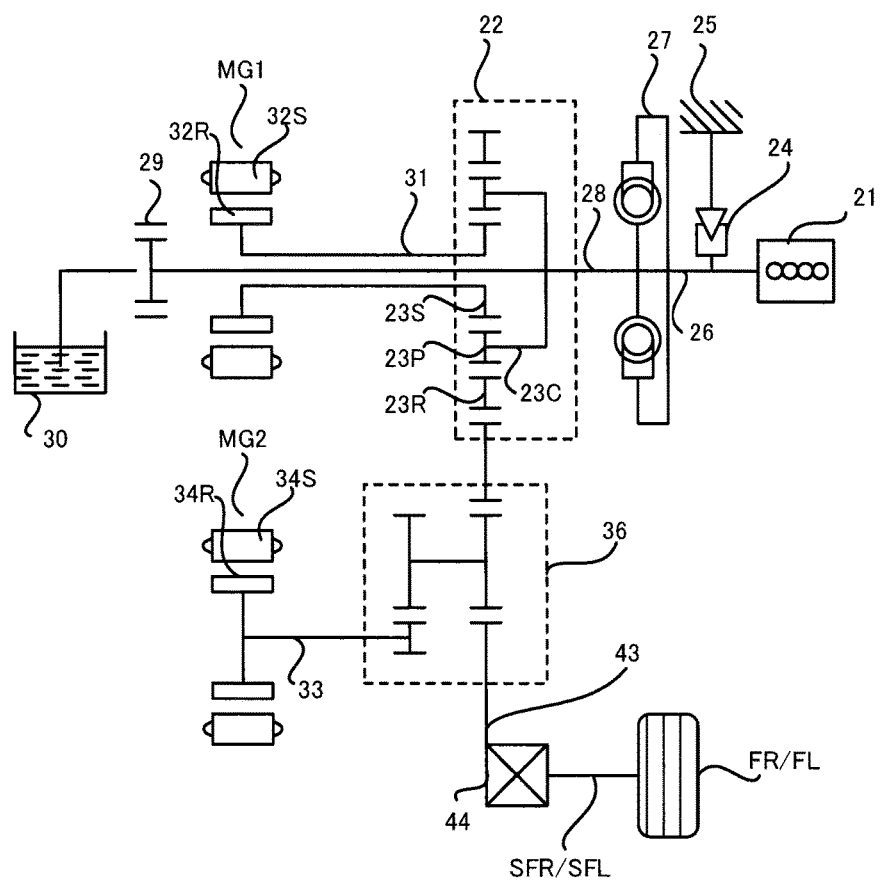

[FIG. 3]
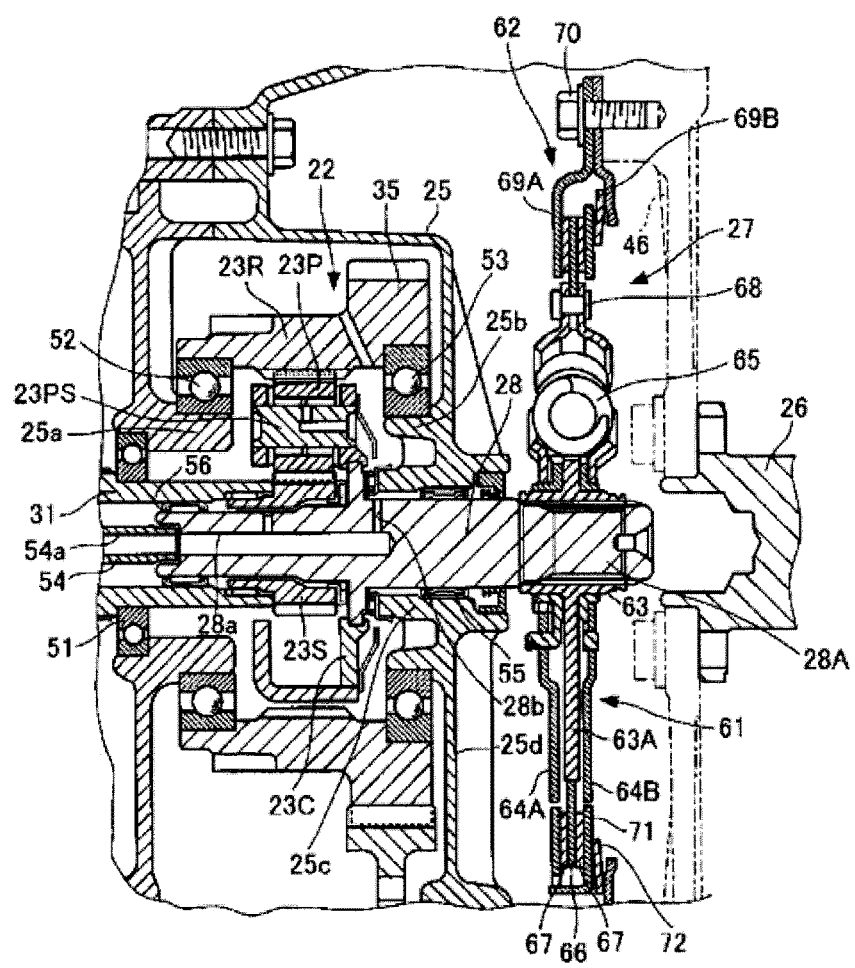

[FIG. 4]
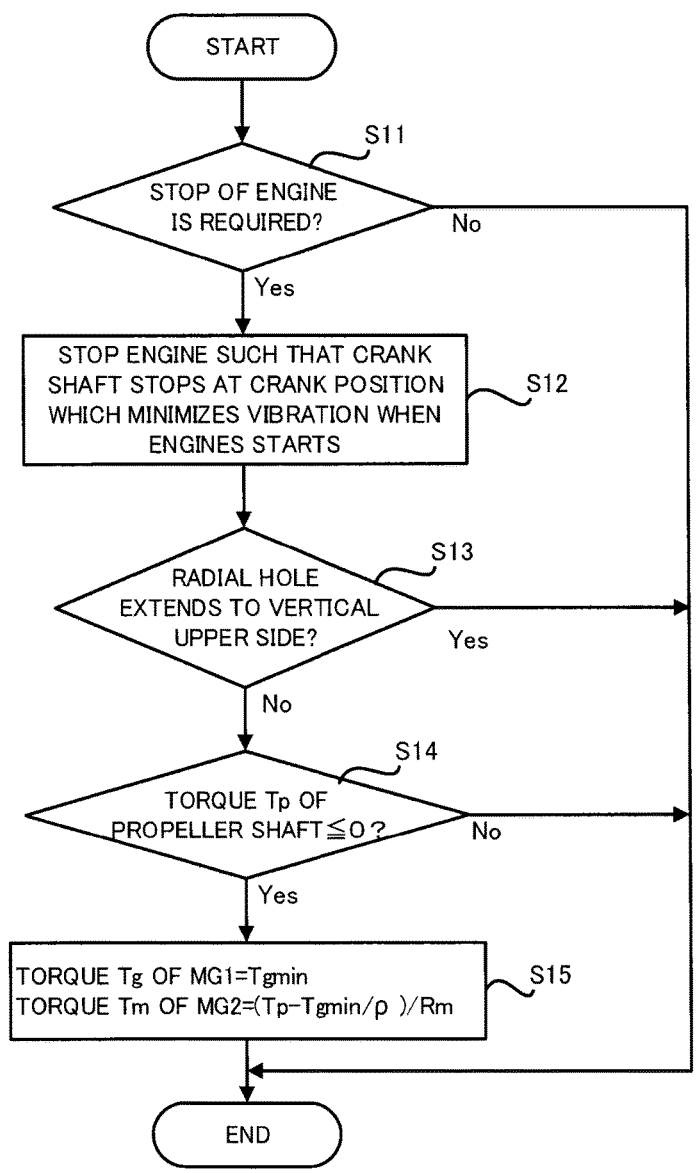

[FIG. 6]
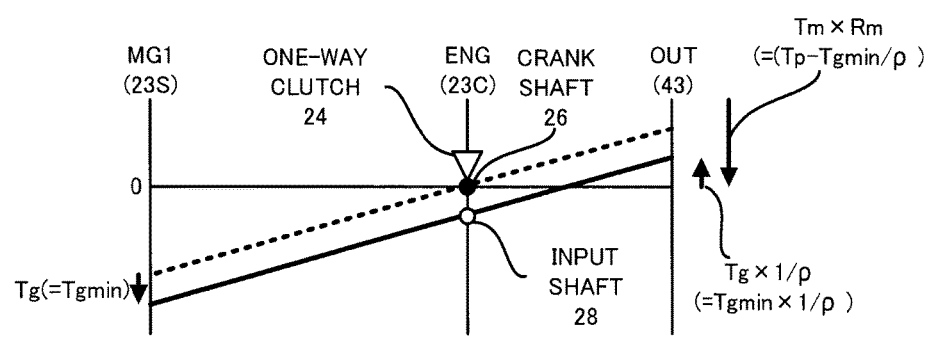

CONTROL APPARATUS FOR HYBRID VEHICLE

TECHNICAL FIELD

The present invention relates to a control apparatus for a hybrid vehicle, especially, a control apparatus for the hybrid vehicle which assists a supply of lubricating oil to a planetary gear train, for example.

BACKGROUND ART

A hybrid vehicle which has a planetary gear train including a sun gear, a carrier and a ring gear which are capable of differentially rotating with one another is known (for example, see Patent Literatures 1 and 2). The Patent Literature 1 proposes a technology for storing a lubricating oil, which is ejected to the planetary gear train via an ejecting hole from an inside of an input shaft of an internal combustion engine, in a lubricating oil tank which is located at an inner surface of the ring gear and which is located at a position which faces a pinion gear along an axial direction, in order to supply the lubricating oil to the planetary gear train. This technology allows the lubricating oil which is stored in the lubricating oil tank to be supplied to the pinion gear via a through-hole which is formed on a wall of the lubricating oil tank by using a water head difference in the lubricating oil tank.

In addition, the Patent Literature 2 is listed as a background art which is related to the present invention. In the Patent Literature 2, a clutch for engaging and opening a connection between the carrier and the input shaft of the internal combustion engine and a brake for stopping a rotation of the carrier are additionally appended to the planetary gear train. When the clutch is in an ON state (namely, the carrier and the input shaft are engaged) and the brake is in an ON state (namely, the rotation of the carrier is stopped), the hybrid vehicle is capable of driving (for example, power-running or regenerating) by using torques of both of a rotating electrical machine which is coupled to the sun gear and a rotating electrical machine which is coupled to the ring gear.

CITATION LIST

Patent Literature

[Patent Literature 1] Japanese Patent Application Laid Open No. 2010-203588

[Patent Literature 2] Japanese Patent Application Laid Open No. 2005-81930

SUMMARY OF INVENTION

Technical Problem

By the way, in the Patent Literature 1, the lubricating oil is stored in the lubricating oil tank by using centrifugal force which is caused by a rotation of the ring gear. Therefore, there is such a technical problem that an adequate amount of lubricant oil is not stored in the lubricant oil tank if a rotational speed of the ring gear is small (in other words, a rotation number is small). As a result, the technology disclosed in the Patent Literature 1 causes such a technical problem that there is possibly a shortage of lubricating performance for the planetary gear train (for example, the pinion gear which the planetary gear train includes) if the rotational speed of the ring gear is small.

Moreover, there is possibly the significant shortage of lubricating performance for the pinion gear when the hybrid vehicle drives by using the torques of both of two rotating electrical machines (namely, the rotating electrical machine which is coupled to the sun gear and the rotating electrical machine which is coupled to the ring gear) as disclosed in the Patent Literature 2. This is because the torque of the electrical rotating machine which is coupled to the sun gear is transmitted from the sun gear to the pinion gear when the hybrid vehicle drives by using the torques of both of the rotating electrical machine which is coupled to the sun gear and the rotating electrical machine which is coupled to the ring gear. Thus, a pressure at a surface between the sun gear and the pinion gear is larger than that in the case where the hybrid vehicle drives by using the torque of only the rotating electrical machine which is coupled to the ring gear, and thus, there is likely the shortage of lubricating performance for the pinion gear The above problem is listed as one example of the problem which the present invention is to solve. It is therefore an object of the present invention to provide, for example, a control apparatus for a hybrid vehicle which is capable of appropriately supplying a lubricating oil to a planetary gear train.

Solution to Problem

<1>

In order to solve the above described problem, a control apparatus of the present invention for a hybrid vehicle is a control apparatus for a hybrid vehicle for controlling the hybrid vehicle, the hybrid vehicle has: an internal combustion engine; a first rotating electrical machine; a second rotating electrical machine whose output shaft is coupled to a drive shaft of the hybrid vehicle; a planetary gear train including (i-1) a first gear which is coupled to an output shaft of the first rotating electrical machine, (i-2) a carrier which is coupled to an input shaft, the input shaft being coupled to an engine shaft of the internal combustion engine, the input shaft being coupled to the engine shaft via a torque limiting mechanism which allows the input shaft to skid against the engine shaft depending on a variation of a torque between the input shaft and the engine shaft, and (i-3) a second gear which is coupled to the drive shaft, (ii) the first gear, the carrier and the second gear being capable of differentially rotating with one another; and a rotation limiting mechanism which allows the engine shaft to rotate in one direction and prevents the engine shaft from rotating in another direction which is different from the one direction, the input shaft having: (i) a supply passage which is formed in the input shaft to supply lubricating oil for keeping a lubrication of the planetary gear train and which extends in an axial direction of the input shaft; and (ii) an ejecting hole which is formed in the input shaft to eject the lubricating oil, which is supplied via the supply passage, to an outside of the input shaft and which extends from the supply passage to the outside of the input shaft, the control apparatus for the hybrid vehicle has: a determining device which determines whether or not the ejecting hole with the internal combustion engine stopped extends in a predetermined direction in which the ejecting hole is capable of ejecting the lubricating oil to a mechanism portion of the planetary gear train which locates vertically above the input shaft; and a driving device which drives the first rotating electrical machine such that a predetermined torque which acts to rotate the input shaft in the another direction is outputted from the first rotating electrical machine until the ejecting hole extends in the predetermined direction, when it is determined that the ejecting hole with the internal combustion engine stopped does not extend in the predetermined direction.

The control apparatus for the hybrid vehicle of the present invention is capable of controlling the hybrid vehicle in which a driving power which is outputted from the internal combustion engine and a driving power which is outputted from two rotating electrical machines (namely, the first rotating electrical machine and the second rotating electrical machine) are distributed by the planetary gear train including the first gear (for example, a sun gear), the carrier and the second gear (for example, a ring gear) which are capable of differentially rotating with one another.

Here, the first gear is directly or indirectly coupled to the output shaft of the first rotating electrical machine.

The carrier is coupled to the input shaft. The input shaft is directly or indirectly coupled to the engine shaft (for example, a crank shaft) of the internal combustion engine via the torque limiting mechanism (for example, a torque limiter or a damper limiter having a torque limiting function). The torque limiting mechanism is an element which allows (in other words, limits) the skid (in other words, relative rotation) of the input shaft against the engine shaft depending on the variation of the torque between the input shaft and the engine shaft. For example, the torque limiting mechanism may allow the input shaft to skid against the engine shaft when the variation of the torque between the input shaft and the engine shaft is equal to or larger than a predetermined value. In this case, the rotation of the input shaft does not lead to the rotation of the engine shaft. On the other hand, the torque limiting mechanism may prevents (prohibits) the input shaft from skidding against the engine shaft when the variation of the torque between the input shaft and the engine shaft is not equal to or larger than a predetermined value. In this case, the rotation of the input shaft leads to the rotation of the engine shaft.

Incidentally, the rotation limiting mechanism allows the engine shaft of the internal combustion engine to rotate in one direction (for example, a rotational direction of the engine shaft of the internal combustion engine when the internal combustion engine acts, and a positive direction for moving the hybrid vehicle ahead along a traveling direction). On the other hand, the rotation limiting mechanism prevents the engine shaft of the internal combustion engine from rotating in another direction (for example, a negative direction which is opposite to the positive direction). Therefore, the engine shaft of the internal combustion engine hardly or never rotate in another direction as long as the rotation limiting mechanism functions.

The second gear is directly or indirectly coupled to the drive shaft of the hybrid vehicle. Moreover, the drive shaft of the hybrid vehicle is coupled to the output shaft of the second rotating electrical machine via another element such as a reduction gear train or the like.

In the present invention, the input shaft which is coupled to the carrier has the supply passage and the ejecting hole, in order to supply the lubricating oil for keeping the lubrication of the planetary gear train to the planetary gear train. The supply passage is a pipe which is formed in the input shaft and corresponds to the pipe extending in the axial direction of the input shaft. Therefore, the input shaft may be a hollow shaft. The lubricant oil at a predetermined pressure is supplied to the supply passage by an operation of an electrical pump or the like. The lubricant oil which is supplied to the supply passage is ejected toward the outside of the input shaft (namely, the planetary gear train) through the ejecting hole which extends from the supply passage to the outside of the input shaft along a direction which intersects with (for example, a direction which is perpendicular to) the axial direction of the input shaft.

Incidentally, it is preferable that a rotational axis of the input shaft be same as a rotational axis of each of the first gear, the carrier and the second gear, because the lubricating oil which is ejected from the ejecting hole of the rotating input shaft is supplied to the planetary gear train including the first gear, carrier and the second gear each of which rotates.

Here, the lubricating oil which is ejected from the ejecting hole is appropriately supplied to the planetary gear train, because a direction in which the ejecting hole of the input shaft extends changes (namely, the ejecting hole rotates around a shaft center of the input shaft) when the input shaft rotates. On the other hand, a state where the input shaft does not rotate (in other words, the input shaft stops) may arise depending on the driving condition of the hybrid vehicle of the present invention. Such a state arises when the internal combustion engine stops. This is because the torque for rotating the input shaft is not transmitted from the internal combustion engine to the input shaft via the engine shaft when the internal combustion engine stops. When the input shaft does not rotate, there is a possibility that the lubricating oil which is ejected from the ejecting hole of the input shaft is not supplied to the planetary gear train, as described later.

Specifically, firstly, it is assumed that the input shaft stops under a state where the ejecting hole extends in a direction from the input shaft to a vertical upper side (namely, a direction for ejecting the lubricating oil against gravity acceleration). In this case, the lubricating oil is ejected from the ejecting hole to the mechanism portion of the planetary gear train which locates vertically above the input shaft. The gravity acceleration allows the lubricating oil which is ejected to the mechanism portion which locates vertically above the input shaft to drip off toward a mechanism portion which locates further below the relevant portion. As a result, when the input shaft stops under the state where the ejecting hole extends in the direction from the input shaft to the vertical upper side, there is a relative small possibility that a mechanism portion of the planetary gear train to which the lubricating oil is not supplied sufficiently exists. Namely, the lubricating oil is appropriately supplied to the planetary gear train.

On the other hand, it is assumed that the input shaft stops under a state where the ejecting hole extends in a direction from the input shaft to a vertical lower side (namely, a direction for ejecting the lubricating oil not against the gravity acceleration). In this case, the lubricating oil is ejected from the ejecting hole to a mechanism portion of the planetary gear train which locates vertically below the input shaft. The lubricating oil which is ejected to the mechanism portion which locates vertically below the input shaft hardly or never move upward to reach the mechanism portion which locates vertically above the input shaft. As a result, when the input shaft stops under the state where the ejecting hole extends in the direction from the input shaft to the vertical lower side, there is a relative large possibility that the mechanism portion of the planetary gear train to which the lubricating oil is not supplied sufficiently exists. Namely, there is a possibility that the lubricating oil is not appropriately supplied to the planetary gear train.

Therefore, the control apparatus for the hybrid vehicle of the present invention adjusts a direction in which the ejecting hole of the input shaft extends (an extending direction of the ejecting hole of the input shaft) when the internal combustion engine stops, and thus appropriately supplies the lubricating oil to the planetary gear train.

The control apparatus has the determining device and the driving device in order to adjust the extending direction of the ejecting hole of the input shaft.

The determining device determines whether or not the ejecting hole extends in the predetermined direction under the state where the internal combustion engine stops.

Here, the "predetermined direction" means a direction in which the lubricating oil can be ejected to the mechanism portion of the planetary gear train which locates vertically above the input shaft (for example, a pinion gear and the like which locates vertically above the input shaft). In this case, it is only necessary that the "predetermined direction" means a direction in which the lubricating oil can be ejected to one part of the mechanism portion of the planetary gear train which locates vertically above the input shaft. However, the "predetermined direction" may mean a direction in which the lubricating oil can be ejected to the entire mechanism portion of the planetary gear train which locates vertically above the input shaft.

By the way, as described above, the rotational axis of the input shaft is same as the rotational axis of each of the first gear, the carrier and the second gear. Thus, the mechanism portion which locates vertically above the input shaft corresponds to an upper half mechanism portion of two mechanism portions into which the planetary gear mechanism is divided along a horizontal surface including the axial center of the input shaft. Therefore, the "predetermined direction" may mean a direction in which the lubricating oil can be ejected to the upper half mechanism portion of two mechanism portions into which the planetary gear mechanism is divided along the horizontal surface including the axial center of the input shaft. One example of the above described "predetermined direction" is a direction intersecting with a line which extends to the vertical upper side at an angle less than 90 degree.

However, considering that the gravity acceleration allows the lubricating oil which is ejected from the ejecting hole to drip off toward the vertical lower side, when the lubricating oil is ejected to more upper mechanism portion of the upper half mechanism portion of two mechanism portions into which the planetary gear mechanism is divided along the horizontal surface including the axial center of the input shaft, it is anticipated that the lubricating oil can be supplied to the planetary gear train more appropriately (for example, the lubricating oil can be supplied more mechanism portions of the planetary gear train). Thus, it is anticipated that the lubricating oil can be supplied to the planetary gear train more appropriately as the angle at which the "predetermined direction" intersects with the line extending to the vertical upper side becomes smaller. Therefore, the "predetermined direction" may be a direction intersecting with the line which extends to the vertical upper side at an angle less than +45 degree or −45 degree, may be a direction intersecting with this line at an angle less than +30 degree or −30 degree, or may be a direction intersecting with this line at an angle less than +15 degree or −15 degree.

However, it is preferable that the "predetermined direction" be a direction intersecting with the line which extends to the vertical upper side at a zero degree angle (however, an angle in which some margin can be allowable as long as it can be substantially regarded as the zero degree), from a viewpoint of making maximum use of the lubricating oil which is ejected from the ejecting hole.

Incidentally, the above described predetermined direction may be set for each hybrid vehicle on the basis of a specification of the pump for supplying the lubricating oil to the supply passage, a size of each of the supply passage, the ejecting hole and a mechanism portion (for example, the first gear, the carrier, the second gear and another gear (for example, the pinion gear)) which constitutes the planetary gear train, a positional relationship between the ejecting hole and each mechanism portion which constitutes the planetary gear train, viscosity of the lubricating oil and the like.

When it is determined that the ejecting hole does not extend in the predetermined direction, there is a possibility that the lubricating oil is not supplied to the planetary gear train appropriately, as with the case where the input shaft stops under the state where the ejecting hole extends in the direction from the input shaft to the vertical lower side. Therefore, in this case, the driving device drives the first rotating electrical machine such that the predetermined torque (typically, a torque in the negative direction) which acts to rotate the input shaft in another direction is outputted from the first rotating electrical machine until the ejecting hole extends in the predetermined direction. Incidentally, the predetermined torque which acts to rotate the input shaft in another direction is typically a torque which acts to rotate the output shaft of the first rotating electrical machine in another direction.

Here, the predetermined torque which acts to rotate the input shaft in another direction is transmitted to the input shaft, which is coupled to the carrier, via the planetary gear train as the predetermined torque which acts to rotate the input shaft in another direction. In this case, since the rotation limiting mechanism prevents the engine shaft which is coupled to the input shaft from rotating in another direction (typically, the negative direction), the variation of the torque between the input shaft and the engine shaft becomes large. As a result, the input shaft which is coupled to the engine shaft via the torque limiting mechanism skids against the engine shaft (in other words, the input shaft rotates against the engine shaft which is fixed by the rotation limiting mechanism). Namely, the input shaft rotates while the engine shaft does not rotate. Therefore, the driving device is capable of rotating the input shaft while maintaining the state where the internal combustion engine stops (in other words, the state where the engine shaft stops). As a result, the lubricating oil is appropriately supplied to the planetary gear train, because the state where the ejecting hole extends in the predetermined direction is realized.

Especially, even if a rotation number of each mechanism portion of the planetary gear train is small, the lubricating oil is appropriately supplied to each mechanism portion of the planetary gear train by using an effect of a free fall, which is caused by the gravity acceleration, of the lubricating oil which is ejected from the ejecting hole. Therefore, the lubricating oil is appropriately supplied to the planetary gear train, regardless of the rotation number of each mechanism portion of the planetary gear train.

In addition, according to the present invention, the input shaft is rotated by the operation of the driving device and thus the lubricating oil is appropriately supplied, while the engine shaft which is coupled to the input shaft does not rotate due to the rotation of the input shaft for supplying the lubricating oil which is realized by the operation of the driving device. Therefore, a technical effect (for example, such a technical effect that a vibration is minimized when the internal combustion engine is started) which is realized by the engine shaft which stops at a desired rotational angle (for example, a rotational angle by which the vibration is minimized when the internal combustion engine is started) is hardly or never prevented.

<2>

In another aspect of the control apparatus for the hybrid vehicle of the present invention, the driving device drives the first rotating electrical machine such that the predetermined torque is outputted from the first rotating electrical machine until the ejecting hole extends in the predetermined direction, when the hybrid vehicle drives in a dual drive traveling mode by which the hybrid vehicle drives by using both of torque which is outputted from the first electrical rotating machine and torque which is outputted from the second electrical rotating machine under a state where the internal combustion engine stops.

When the hybrid vehicle drives in the dual drive traveling mode, the torque which is outputted from the first rotating electrical machine is transmitted from the first gear to another gear (for example, the pinion gear) which engages with the first gear. Thus, when the hybrid vehicle drives in the dual drive traveling mode, there is likely the shortage of lubricating performance because a pressure at a surface between the first gear and another gear which engages with the first gear is larger than that in the case where the hybrid vehicle does not drive in the dual drive traveling mode.

However, according to this aspect, when the hybrid vehicle drives in the dual drive traveling mode, the predetermined torque is outputted from the first rotating electrical machine until the ejecting hole extends in the predetermined direction. Therefore, the shortage of the lubricating performance for the planetary gear train, which significantly arises when the hybrid vehicle drives in the dual drive traveling mode, can be resolved appropriately.

Incidentally, in the dual drive traveling mode, the second rotating electrical machine outputs a torque (typically, a torque in the positive direction) which acts to rotate the output shaft of the second rotating electrical machine in one direction, as described later in detail by using a nomogram. The torque which is outputted from the second rotating electrical machine is transmitted to the drive shaft of the hybrid vehicle as the torque (typically, the torque in the positive direction) which acts to rotate the drive shaft of the hybrid vehicle in one direction. In addition, in the dual drive traveling mode, the first rotating electrical machine outputs a torque (typically, a torque in the negative direction) which acts to rotate the output shaft of the first rotating electrical machine in another direction. The torque which is outputted from the first rotating electrical machine is transmitted to the drive shaft of the hybrid vehicle via the planetary gear train as the torque (typically, the torque in the positive direction) which acts to rotate the drive shaft of the hybrid vehicle in one direction. As a result, the hybrid vehicle is capable of driving in the dual drive traveling mode. On the other hand, the torque (typically, the torque in the negative direction) which is outputted from the first rotating electrical machine is transmitted to the input shaft which is coupled to the carrier via the planetary gear train as the torque (typically, the torque in the negative direction) which acts to rotate the input shaft in another direction. Thus, as described above, the input shaft rotates while the state where the internal combustion engine stops (in other words, the state where the engine shaft does not rotate) is maintained by the operation of the rotation limiting mechanism and the torque limiting mechanism. Therefore, when the hybrid vehicle drives in the dual drive traveling mode, the driving device does not necessarily rotate the input shaft, because the input shaft rotates as long as the first rotating electrical machine outputs the torque (typically, the torque in the negative direction) which acts to rotate the output shaft of the first rotating electrical machine in another direction.

However, even if the hybrid vehicle drives in the dual drive traveling mode, the state where the first rotating electrical machine does not output the torque (typically, the torque in the negative direction) which acts to rotate the output shaft of the first rotating electrical machine in another direction may arise temporarily or permanently. Such a state arises when the torque which is outputted from the first rotating electrical machine is not necessary for the drive (for example, a power-running or a regeneration) of the hybrid vehicle. In this case, a torque for rotating the carrier is not transmitted to the carrier which is coupled to the first gear via another gear (for example, the pinion gear), because the first rotating electrical machine whose output shaft is coupled to the first gear does not output the torque. As a result, the input shaft to which the carrier is coupled does not rotate. Therefore, in this case, it is preferable that the driving device drive the first rotating electrical machine such that the predetermined torque (typically, the torque in the negative direction) which acts to rotate the input shaft in another direction is outputted from the first rotating electrical machine until the ejecting hole extends in the predetermined direction.

Incidentally, the hybrid vehicle of the present invention is capable of driving in a single drive traveling mode by which the hybrid vehicle drives by using either one of the torque which is outputted from the first electrical rotating machine and the torque which is outputted from the second electrical rotating machine under a state where the internal combustion engine stops, as well as in the dual drive traveling mode. When the hybrid vehicle drives in the single drive traveling mode, the state where the first rotating electrical machine does not output the torque (typically, the torque in the negative direction) which acts to rotate the output shaft of the first rotating electrical machine in another direction arise more easily, compared to the case where the hybrid vehicle drives in the dual drive traveling mode. Even in this case, it is preferable that the driving device drive the first rotating electrical machine such that the predetermined torque (typically, the torque in the negative direction) which acts to rotate the input shaft in another direction is outputted from the first rotating electrical machine until the ejecting hole extends in the predetermined direction.

<3>

In another aspect of the control apparatus for the hybrid vehicle of the present invention, the driving device drives the first rotating electrical machine such that the predetermined torque is outputted from the first rotating electrical machine until the ejecting hole extends in the predetermined direction, when the hybrid vehicle which drives in the dual drive traveling mode stops or decelerates.

According to this aspect, when the hybrid vehicle which drives in the dual drive traveling mode stops or decelerates (in other words, does not move at a constant speed and does not accelerate), the state where the first rotating electrical machine does not output the torque (typically, the torque in the negative direction) which acts to rotate the output shaft of the first rotating electrical machine in another direction arises more easily. This is because there is a high possibility that a torque which is required by the hybrid vehicle is satisfied without using the torque which is outputted from the first rotating electrical machine, when the hybrid vehicle stops. Alternatively, this is because there is relatively small need for the first rotating electrical machine to output the torque which acts to rotate the output shaft of the first rotating electrical machine in another direction (namely, a torque which acts to rotate the drive shaft of the hybrid vehicle in one direction, and a torque which acts to prevent the deceleration of the hybrid vehicle), when the hybrid vehicle decelerates.

Therefore, according to this aspect, even if the state where the first rotating electrical machine does not output the torque (typically, the torque in the negative direction) which acts to rotate the output shaft of the first rotating electrical machine in another direction arises due to the stop or the deceleration of the hybrid vehicle, the driving device is capable of driving the first rotating electrical machine such that the predetermined torque (typically, the torque in the negative direction) which acts to rotate the input shaft in another direction is outputted from the first rotating electrical machine until the ejecting hole extends in the predetermined direction.

Incidentally, it may be determined whether or not the hybrid vehicle stops or decelerate by monitoring the torque which is transmitted to the drive shaft of the hybrid vehicle. For example, when the torque which is transmitted to the drive shaft of the hybrid vehicle is a torque (typically, the torque in the negative direction) which makes the hybrid vehicle move backward along the traveling direction, it may be determined that the hybrid vehicle stops or decelerates.

<4>

In another aspect of the control apparatus for the hybrid vehicle of the present invention, the internal combustion engine and the planetary gear train are assembled such that a target value of a rotational angle of the engine shaft at a timing when the engine shaft stops rotating due to the stop of the internal combustion engine is same as a rotational angle of the input shaft with the ejecting hole extending in the predetermined direction.

According to this aspect, the input shaft stops in the state the ejecting hole extends in the predetermined direction at the timing when the internal combustion engine stops. Therefore, the first rotating electrical machine does not necessarily output the predetermined torque which acts to rotate the input shaft in another direction in order to make the ejecting hole extends in the predetermined direction. The driving device drives the first rotating electrical machine less frequently to output the predetermined torque for making the ejecting hole extend in the predetermined direction. Thus, an electrical power which is consumed by the driving of the first rotating electrical machine can be reduced than that in the case where the internal combustion engine and the planetary gear train are not assembled in a manner of this aspect.

Incidentally, the target value of the rotational angle of the engine shaft at the timing when the engine shaft stops rotating due to the stop of the internal combustion engine typically means a rotational angle of the engine shaft which is capable of minimizing the vibration which is generated when the internal combustion engine is started. However, the target value of the rotational angle of the engine shaft at the timing when the engine shaft stops rotating due to the stop of the internal combustion engine may be another rotational angle.

The operation and other advantages of the present invention will become more apparent from embodiments explained below.

BRIEF DESCRIPTION OF DRAWINGS

FIG. 1 is a block diagram illustrating one example of a structure of a hybrid vehicle of the present embodiment.

FIG. 2 is a block diagram illustrating one example of a structure of a hybrid drive apparatus.

FIG. 3 is a cross sectional diagram illustrating a cross sectional surface of one portion of the hybrid drive apparatus (specifically, the structure in the vicinity of the power dividing apparatus) along a direction which is parallel to the input shaft.

FIG. 4 is a flowchart illustrating a flow of an operation of controlling the hybrid drive apparatus (especially, a control operation which is related to the supply of the oil to the power dividing apparatus).

FIG. 6 is a nomogram illustrating the operational state of the hybrid drive apparatus when the extending direction of the radial hole.

DESCRIPTION OF EMBODIMENTS

Figure 5A:
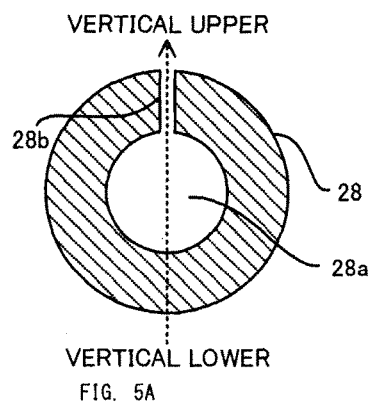
FIGS. 5A, 5B, 5C, 5D, 5E, and 5F are cross sectional diagrams each of which illustrates a cross sectional surface of one portion of the input shaft at which the radial hole is formed which is perpendicular to the axial center of the input shaft.

Hereinafter, an embodiment of the present invention will be explained, with reference to the drawings.

(1) Structure of Hybrid Vehicle 1

Firstly, with reference to FIG. 1, a structure of the hybrid vehicle 1 of the present embodiment will be explained. FIG. 1 is a block diagram illustrating one example of the structure of the hybrid vehicle 1 of the present embodiment.

As illustrated in FIG. 1, the hybrid vehicle 1 has a hybrid drive apparatus 10, an ECU (Electronic Control Unit) 11 which is one example of the "control apparatus", a PCU (Power Control Unit) 12 and a battery 13.

The ECU 11 is an electrical controlling unit which controls an operation of each part of the hybrid vehicle 1, and is one example of the "control apparatus for the hybrid drive apparatus". The ECU 11 has a CPU (Central Processing Unit), a ROM (Read Only Memory), a RAM (Random Access Memory) and so on, for example. The ECU 11 controls an operational state of the hybrid drive apparatus 10 in accordance with a control program which is stored in the ROM. Incidentally, the ECU 11 is one example of each of the "determining device" and the "driving device".

The hybrid drive apparatus 10 is a power train unit for driving the hybrid vehicle 1 by supplying a driving torque as a driving power to a left axle axis SFL and a right axle axis SFR which are respectively coupled to a front-left wheel FL and a front-right wheel FR which are drive wheels of the hybrid vehicle 1. Incidentally, a detailed structure of the hybrid drive apparatus 10 will be described later (see FIG. 2 and FIG. 3)

The PCU 12 is an electrical power controlling unit for controlling input/output of the electrical power among the battery 13 and below described motor generators MG1 and MG2 (see FIG. 2) and input/output of the electrical power between the motor generator MG1 and the motor generator MG2. For example, the PCU 12 converts a DC (Direct Current) electrical power which is supplied from the battery 13 into an AC (Alternate Current) electrical power and supplies the AC electrical power to the motor generators MG1 and MG2. Furthermore, the PCU 12 converts the AC electrical power which is generated by the motor generators MG1 and MG2 into the DC electrical power and supplies the DC electrical power to the battery 13.

The battery 13 has a structure in which a plurality of lithium ion battery cells are connected in series and is a rechargeable battery unit which functions as a supply source of the electrical power used for driving the motor generators MG1 and MG2. However, the battery 13 may be a battery unit which includes a nickel hydrogen batter as its element or may be some type of capacitor device such as an electric double layer capacitor or the like.

(2) Structure of Hybrid Drive Apparatus 10

Next, with reference to FIG. 2, a detailed structure of the hybrid drive apparatus 10 will be explained. FIG. 2 is a block diagram illustrating one example of the structure of the hybrid drive apparatus 10.

As illustrated in FIG. 2, the hybrid drive apparatus 10 has an engine 21 which is one example of the "internal combustion engine"; the motor generator MG1 which is one example of the "first rotating electrical machine"; the motor generator MG2 which is one example of the "second rotating electrical machine"; and a power dividing apparatus 22 which is one example of the "planetary gear train".

The power dividing apparatus 22 is a planetary gear train. Specifically, the power dividing apparatus 22 has a sun gear 23S which is one example of the "first gear", a pinion gear 23P, a ring gear 23R which is one example of the "second gear", and a carrier 23C. The sun gear 23S is an external gear which rotates in a center of the plurality of gear elements. The pinion gear 23P is an external gear which orbits the sun gear 23S while contacting the sun gear 23S and rotating. The ring gear 23R is an internal gear which is formed as a hollow ring to engage the pinion gear 23P. The carrier 23C rotatably supports the pinion gear 23P via a pinion shaft 23PS and rotates due to the orbital movement of the pinion gear 23P.

A torque (a rotational torque) which is generated by the driving of the engine 21 is transmitted to an input shaft 28 as an input shaft via a crank shaft 26 which is an engine shaft of the engine 21 and a coil-spring type damper apparatus 27 with a torque limiter. Incidentally, the damper apparatus 27 with the torque limiter is one example of the "torque limiting mechanism".

The crank shaft 26 is coupled to a one-way clutch 24 which prevents an inverse rotation (namely, a rotation in a negative direction) of the crank shaft 26. Thus, the one-way clutch 24 substantially prevents an inverse rotation (namely, a rotation in the negative direction) of the engine 21. The one-way clutch 24 is attached to a case 25 of a transaxle which has the power dividing apparatus 22.

An electrical oil pump 29 is located on an axial center of the input shaft 28. The electrical oil pump 29 operates by using the electrical power which is supplied from the battery 13. The electrical oil pump 29 pumps up oil which is stored in an oil pan 30. The electrical oil pump 29 supplies the pumped oil to a machinery portion (for example, each gear element, a rotational portion and a sliding portion of each shaft) of the power dividing apparatus 22. As a result, the oil produces a cooling performance, a performance of reducing a friction resistance, a performance of preventing corrosion, a performance of keeping air tight and the like.

The motor generator MG1 is an AC type synchronous motor generator which has a motor shaft 31, a rotor 32R and a stator 32S. The motor shaft 31 is rotatably located coaxially with the input shaft 28 and around the input shaft 28. The rotor 32R is a permanent magnet which is attached to the motor shaft 31. A three-phase coil is wound to the stator 32S.

The motor generator MG2 is an AC type synchronous motor generator which has a motor shaft 33, a rotor 34R and a stator 34S. The motor shaft 33 is rotatably located in parallel with the input shaft 28. The rotor 34R is a permanent magnet which is attached to the motor shaft 33. A three-phase coil is wound to the stator 34S.

Here, in the power dividing apparatus 22, the carrier 23C is coupled to the input shaft 28 of the engine 21. The sun gear 23S is splined to the motor shaft 31 of the motor generator MG1. The ring gear 23R is coupled to a propeller shaft 43 which is a drive shaft via a reduction gear 36. In addition, the propeller shaft 43 is coupled to the motor shaft 33 of the motor generator MG2 via the reduction gear 36.

The power dividing apparatus 22 transmits one portion of an output of the engine 21 to the propeller shaft 43 via the input shaft 28, the carrier 23C, the pinion gear 23P and the ring gear 23P. Moreover, the power dividing apparatus 22 transmits the other portion of the output of the engine 21 to the rotor 32R of the motor generator MG1 via the input shaft 28, the carrier 23C, the pinion gear 23P and the sun gear 23S. As a result, the motor generator MG1 is capable of operating as a generator.

The propeller shaft 43 is coupled to the left axle shaft SFL and the right axle shaft SFR via the front-left wheel FL, the front-right wheel FR and a differential gear which cancels out a difference between the rotations of the front-left wheel FL and the front-right wheel FR.

Here, with reference to FIG. 3, a structure in the vicinity of the power dividing apparatus 22 will be explained in detail. FIG. 3 is a cross sectional diagram illustrating a cross sectional surface of one portion of the hybrid drive apparatus 10 (specifically, the structure in the vicinity of the power dividing apparatus 22) along a direction which is parallel to the input shaft 28.

As illustrated in FIG. 3, the motor shaft 31 of the motor generator MG1 is rotatably attached to the case 25 of the transaxle via a ball bearing 51. An inner portion of the ring gear 23R of the power dividing apparatus 22 is rotatably supported by circular supporters 25a and 25b of the case 25 via ball bearings 52 and 53.

The motor shaft 31 of the motor generator MG1 is formed in a hollow shape. An edge of the motor shaft 31 is splined to an edge of the input shaft 28. Moreover, the edge of the input shaft 28 is coupled to one edge of an oil pump drive shaft 54. The other edge of the oil pump drive shaft 54 is coupled to the electrical oil pump 29.

A communicating hole 54a, which extends in an axial direction of the oil pump drive shaft 54, is formed in the oil pump drive shaft 54. The oil which is pumped by the electrical oil pump 29 is supplied from the other edge to one edge of the oil pump drive shaft 54 via the communicating hole 54a.

A communicating hole 28a, which extends in an axial direction of the input shaft 28, is formed in the input shaft 28. The communicating hole 28a is coupled to the communicating hole 54a of the oil pump drive shaft 54. Moreover, a radial hole 28b is formed at the communicating hole 28a. The radial hole 28b extends from the communicating hole 28a in a radial direction of the input shaft 28. Incidentally, the communicating hole 28a and the radial hole 28b are one examples of the "supply passage" and the "ejecting hole", respectively.

The oil which is supplied from the electrical oil pump 29 to the communicating hole 54a of the oil pump drive shaft 54 and the communicating hole 28a of the input shaft 28 is ejected from the radial hole 28b to the power dividing apparatus 22 by the operation of the electrical oil pump 29 (namely, a pressure which is applied by the electrical oil pump 29).

On the other hand, the input shaft 28 is rotatably coupled to a hollow supporter 25c of the case 25 via a needle bearing 55. Moreover, the input shaft 28 is rotatably supported by the motor shaft 31 via a needle bearing 56.

The case 25 has a wall portion 25d whose axial center extends from an outer portion of the hollow supporter 25c in a direction which is substantially perpendicular to the input shaft 28. The circular supporter 25b protrudes from the wall portion 25d in the axial direction of the input shaft 28 to be away from the needle bearing 55 in the axial direction of the input shaft 28.

Thus, a rotational center axis of the ball bearing 53 is located to be away from a rotational center axis of the needle bearing 55 in the axial direction of the input shaft 28. Moreover, a center portion of the rotational center axis of the needle bearing 55 along the axial direction is located on the axial center of the wall portion 25d. As a result, the ball bearing 53 and the needle bearing 55 are located between the ring gear 23R and the input shaft 28.

The damper apparatus 27 with the torque limiter which constructs a damper mechanism has a damper unit 61 and limiter unit 62.

The damper unit 61 is a mechanism for buffering and absorbing a variation (change) of a driving torque of a flywheel 46 which is fixed to the crank shaft 26 of the engine 21. The limiter unit 62 is a mechanism for preventing the power from being transmitted from the crank shaft 26 to the input shaft 28 and for preventing the power from being transmitted from the input shaft 28 to the crank shaft 26 when the variation of the torque between the damper unit 61 and the flywheel 46 (the variation of the torque between the input shaft 28 and the crank shaft 26) reaches a predetermined value (a limit torque value).

The damper unit 61 has a hub 63, side plates 64A and 64B, a damper element 65, a disk 66, a friction element 67 and a rivet 68.

The hub 63 has a flange 63A which extends in the radial direction and an inner spline. The hub 63 is coupled to an outer spline which is formed on an outer surface of a protruding portion 28A of the input shaft 28 which protrudes outwardly from the hollow supporter 25c. Moreover, a plurality of cutouts, which are toward the outside along the radial direction, are formed at the flange 63A, and the damper element 65 which is supported by a spring sheet is arranged in the cutouts.

A through-hole is formed at an outer circumferential side of each of the side plates 64A and 64B. The side plates 64A and 64B supports the disk 66 by using the rivet 68 and are arranged coaxially with the hub 63 to relatively rotate. Moreover, a plurality of window holes in which the damper element 65 is included are formed at the side plates 64A and 64B.

The damper element 65 is constructed from a coil spring and are included in the cutouts and window holes which are respectively formed at positions, which face to each other, of the hub 63 and the side plates 64A and 64B. The disk 66 is a circular disk which is arranged at the outer circumferential side of the side plates 64A and 64B. The disk 66 is supported by the side plates 64A and 64B from both sides. A circular friction element 67 is fixed to both sides of the disk 66 along the axial direction.

The limiter unit 62 has plates 69A and 69B at which an aperture is formed and which are fixed to the flywheel 46 by a bolt 70, a friction plate 71 which supports the friction element 67 with the plate 69A, a disk spring 72 which is located between the friction plate 71 and plate 69B and allows the plate 69A and the friction plate 71 to support the friction element 67 by biasing (pressing) the friction plate 71 toward the plate 69A.

The limit torque value is determined on the basis of the bias force of the disk spring 72, and the friction element 67 skids against the plate 69A and the friction plate 71, which prevents the power from being transmitted from the crank shaft 26 to the input shaft 28 and prevents the power from being transmitted from the input shaft 28 to the crank shaft 26, when the flywheel 46 engages with the damper unit 61 by the friction via the limiter unit 62 and the variation of the torque between the damper unit 61 and the flywheel 46 is more than the limit torque value.

(3) Operation of Hybrid Drive Apparatus 10

Next, with reference to FIG. 4, an operation of controlling the hybrid drive apparatus 10 (especially, a control operation which is related to the supply of the oil to the power dividing apparatus 22), which is performed by the ECU 11, will be explained. FIG. 4 is a flowchart illustrating a flow of the operation of controlling the hybrid drive apparatus 10 (especially, the control operation which is related to the supply of the oil to the power dividing apparatus 22).

Here, before explaining the operation of controlling the hybrid drive apparatus 10 (especially, the control operation which is related to the supply of the oil to the power dividing apparatus 22), a method of supplying the oil from the radial hole 28b which is formed in the input shaft 28 to the power dividing apparatus 22 will be explained as a premise of the control operation.

As described above, the oil is ejected to the power dividing apparatus 22 via the communicating hole 28a and the radial hole 28b in the input shaft 28.

In this case, when the input shaft 28 rotates, the direction in which the radial hole 28b extends (the extending direction of the radial hole 28b) changes. Namely, the radial hole 28b is capable of ejecting the oil to an omnidirectional direction (namely, 360 degree direction) from the axial center of the communicating hole 28a (in other words, the input shaft 28). Therefore, the oil which is ejected from the radial hole 28b is appropriately supplied to the power dividing apparatus 22 (especially, the pinion gear 23P). On the other hand, a state where the input shaft 28 does not rotate (in other words, the input shaft 28 stops rotating) may arise depending on the driving condition of the hybrid vehicle 1. Such a state arises when the engine 21 stops. This is because the torque for rotating the input shaft 28 is not transmitted from the engine 21 to the input shaft 28 via the crank shaft 26 and the damper apparatus 27 with the torque limiter when the engine 21 stops. When, the input shaft 28 does not rotate, there is a possibility that the oil which is ejected from the radial hole 28b formed in the input shaft 28 is not appropriately supplied to the power dividing apparatus 22, as described later.

Specifically, firstly, it is assumed that the input shaft 28 stops under a state where the radial hole 28b extends in a direction from the communicating hole 28a to a vertical upper side (namely, a direction for ejecting the oil against gravity acceleration from the radial hole 28b). In this case, the oil is ejected from the radial hole 28b to a mechanism portion of the power dividing apparatus 22 which locates vertically above the input shaft 28. The gravity acceleration allows the oil which is ejected to the mechanism portion which locates vertically above the input shaft 28 to drip off toward a mechanism portion which locates further below the relevant portion. As a result, when the input shaft 28 stops under the state where the radial hole 28b extends in the direction from the communicating hole 28a to the vertical upper side, there is a relative small possibility that a mechanism portion of the power dividing apparatus 22 to which the oil is not supplied sufficiently exists. Namely, the oil is appropriately supplied to the power dividing apparatus 22.

On the other hand, it is assumed that the input shaft 28 stops under a state where the radial hole 28b extends in a direction from the communicating hole 28a to a vertical lower side (namely, a direction for ejecting the oil not against the gravity acceleration from the radial hole 28b). In this case, the oil is ejected from the radial hole 28b to a mechanism portion of the power dividing apparatus 22 which locates vertically below the input shaft 28. The oil which is ejected to the mechanism portion which locates vertically below the input shaft 28 hardly or never move upward to reach the mechanism portion which locates vertically above the relevant portion. As a result, when the input shaft 28 stops under the state where the radial hole 28b extends in the direction from the communicating hole 28a to the vertical lower side, there is a relative large possibility that the mechanism portion of the power dividing apparatus 22 to which the lubricating oil is not supplied sufficiently exists. Namely, there is a possibility that the oil is not appropriately supplied to the power dividing apparatus 22.

Therefore, the ECU 11 of the present embodiment performs the control operation for adjusting the extending direction of the radial hole 28b formed in the input shaft 28 when the engine 21 stops, and thus appropriately supplying the oil to the power dividing apparatus 22.

As illustrated in FIG. 4, in order to appropriately supply the oil to the power dividing apparatus 22, the ECU 11 determines whether or not a flag for requiring the stop of the engine 21 is in an ON state (namely, the engine 21 is required to stop) (step S11). Namely, the ECU 11 determines whether or not the stop of the currently operating engine 21 is required.

Incidentally, the flag for requiring the stop of the engine 21 may be changed to the ON state when a traveling mode of the hybrid vehicle 1 is changed from an engine traveling mode by which the torque outputted from the engine 21 is used or a HV traveling mode by which the torque outputted from the engine 21 and the torque Tm outputted from the motor generator MG2 are used to a EV traveling mode by which at least one of the torque Tg outputted from the motor generator MG1 and the torque Tm outputted from the motor generator MG2 is used.

Alternatively, it may be changed to the ON state when the hybrid vehicle 1 which drives in the engine traveling mode or the HV traveling mode stops. Alternatively, the flag for requiring the stop of the engine 21 may be changed to the ON state when the hybrid vehicle 1 which charges the battery 13 by driving the motor generator MG1 using the torque outputted from the engine 21 stops the charge and drives in the EV traveling mode.

As a result of the determination at the step S11, when it is determined that the flag for requiring the stop of the engine 21 is not in the ON state (namely, the engine 21 is not required to stop) (step S11: No), the ECU 11 may finish the operation illustrated in FIG. 4. Then, the ECU 11 may perform the operation illustrated in FIG. 4 periodically or non-periodically.

On the other hand, as a result of the determination at the step S11, when it is determined that the flag for requiring the stop of the engine 21 is in the ON state (namely, the engine 21 is required to stop) (step S11: Yes), the ECU 11 outputs a command for stopping the engine 21 to the engine 21 (step S12). As a result, the engine 21 stops (step S22).

At this step, the ECU 11 outputs the command for stopping the engine 21 such that the crank shaft 26 stops at a desired crank angle (step S22). For example, the ECU 11 outputs the command for stopping the engine 21 such that the crank shaft 26 stops at a crank angle which is capable of minimizing a vibration when the engine 21 is restarted (step S22). As a result, the engine 21 stops such that the crank shaft 26 stops at the desired crank angle (step S22).

Incidentally, in the below explanation, it is assumed that the hybrid vehicle 1 drives (namely, power-runs or regenerates) in the EV traveling mode after the engine 21 stops, for the purpose of the simple explanation. Especially, in the below explanation, it is assumed that the hybrid vehicle 1 drives in a MG1/2 dual drive traveling mode by which both of the torque Tg outputted from the motor generator MG1 and the torque Tm outputted from the motor generator MG2 are used for the drive, for the purpose of the simple explanation.

Here, the MG1/2 dual drive traveling mode corresponds to a traveling mode by which the motor generator MG1 is used as not the generator but the motor, both of the torque Tg outputted from the motor generator MG1 and the torque Tm outputted from the motor generator MG2 are transmitted to the propeller shaft 43 and both of the torque Tg and the torque Tm are used as the driving power of the hybrid vehicle 1 and a braking power for the regeneration.

More specifically, in the MG1/2 dual drive traveling mode, the motor generator MG2 outputs a positive torque Tm (the traveling direction of the hybrid vehicle 1 is a positive direction). The positive torque Tm which is outputted from the motor generator MG2 is transmitted as a positive torque Tm*Rm (Rm is a reduction ratio of the reduction gear 36) to the propeller shaft 43 of the hybrid vehicle 1 via the reduction gear 36. In addition, in the MG1/2 dual drive traveling mode, the motor generator MG1 outputs a negative torque Tg. The negative torque Tg which is outputted from the motor generator MG1 is transmitted as a positive torque Tg*1/p (p is a gear ratio of the power dividing apparatus 22) to the propeller shaft 43 of the hybrid vehicle 1 via the power dividing apparatus 22 and the reduction gear 36. As a result, the hybrid vehicle drives by using both of the torque Tg outputted from the motor generator MG1 and the torque Tm outputted from the motor generator MG2.

On the other hand, the negative torque Tg which is outputted from the motor generator MG1 is transmitted as the negative torque to the input shaft 28 via the power dividing apparatus 22. In this case, the one-way clutch 24 prevents the crank shaft 26 which is coupled to the input shaft 28 from rotating in the negative direction. Namely, the crank shaft 26 substantially functions as a fixed shaft to the input shaft 28 to which the negative torque is transmitted. Therefore, the variation of the torque between the input shaft 28 and the crank shaft 26 becomes large. As a result, the damper apparatus 27 with the torque limiter prevents the power from being transmitted from the input shaft 28 to the crank shaft 26 (namely, a transmission of the torque). Therefore, the input shaft 28 skids against the crank shaft 26 (in other words, rotates in the negative direction to the fixed crank shaft 26). Thus, the hybrid vehicle 1 is capable of driving in the MG1/2 dual drive traveling mode while stopping the engine 21 (furthermore, without rotating the crank shaft 26 which stops at the desired crank angle).

After the operation at the step S12 is performed, the ECU 11 determines whether or not the radial hole 28b extends from the communicating hole 28a to the vertical upper side (step S13). Namely, the ECU 11 determines whether or not the radial hole 28b extends in the direction from the communicating hole 28a to the vertical upper side (namely, the direction which corresponds to a line directing from the communicating hole 28a to the vertical upper side) (step S13).

As a result of the determination at the step S13, when it is determined that the radial hole 28b extends from the communicating hole 28a to the vertical upper side (step S13: Yes), it is anticipated that the oil is appropriately supplied to the power dividing apparatus 22, as described above. Thus, in this case, the ECU 11 does not necessarily adjust the extending direction of the radial hole 28b formed in the input shaft 28. Therefore, the ECU 11 finishes the operation illustrated in FIG. 4. Then, the ECU 11 may perform the operation illustrated in FIG. 4 periodically or non-periodically.

On the other hand, as a result of the determination at the step S13, when it is determined that the radial hole 28b does not extend from the communicating hole 28a to the vertical upper side (step S13: No), there is a possibility that the oil is not appropriately supplied to the power dividing apparatus 22, as described above. Thus, in this case, it is preferable that the ECU 11 adjust the extending direction of the radial hole 28b formed in the input shaft 28. Therefore, the ECU 11 performs the below described operation from step S14 to step S15.

Incidentally, at the step S13, it is determined whether or not the radial hole 28b extends from the communicating hole 28a to the vertical upper side. However, even if the radial hole 28b does not extend from the communicating hole 28a to the vertical upper side, the ECU 11 may not adjust the extending direction of the radial hole 28b formed in the input shaft 28 in some cases. Hereinafter, with reference to FIGS. 5A-5F, the extending direction of the radial hole 28b will be explained. FIGS. 5A-5F are cross sectional diagrams each of which illustrates a cross sectional surface of one portion of the input shaft 28 at which the radial hole 28b is formed which is perpendicular to the axial center of the input shaft 28.

FIG. 5A illustrates a state where the radial hole 28b extends from the communicating hole 28a to the vertical upper side. On the other hand, FIG. 5B illustrates a state where the radial hole 28b does not extend from the communicating hole 28a to the vertical upper side (specifically, the radial hole 28b extends from the communicating hole 28a to the vertical lower side).

As illustrated in FIG. 5A, when the radial hole 28b extends from the communicating hole 28a to the vertical upper side, the oil is appropriately supplied to the power dividing apparatus 22, as described above. Therefore, in this case, the ECU 11 does not necessarily adjust the extending direction of the radial hole 28b formed in the input shaft 28.

Figure 5B:
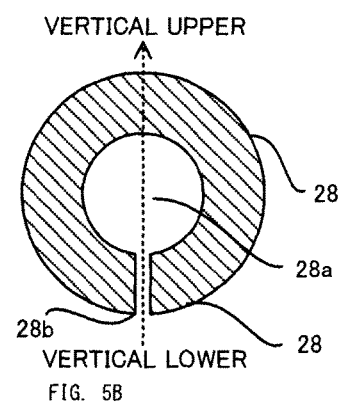

As illustrated in FIG. 5B, when the radial hole 28b extends from the communicating hole 28a to the vertical lower side, there is a possibility that the oil is not appropriately supplied to the power dividing apparatus 22, as described above. Therefore, in this case, it is preferable that the ECU 11 adjust the extending direction of the radial hole 28b formed in the input shaft 28.

On the other hand, when the radial hole 28b is in an intermediate state (for example, see FIG. 5C to FIG. 5F between the state which is illustrated in FIG. 5A and the state which is illustrated in FIG. 5B, the oil may be sometimes appropriately supplied to or may not be sometimes appropriately supplied to the power dividing apparatus 22. Therefore, when the radial hole 28b is in the intermediate state between the state which is illustrated in FIG. 5A and the state which is illustrated in FIG. 5B, it is preferably determined whether or not there is a possibility that the oil is not appropriately supplied to the power dividing apparatus 22 (namely, whether or not the extending direction of the radial hole 28b formed in the input shaft 28 is preferably adjusted) on the basis of a below described standard.

Figure 5C:
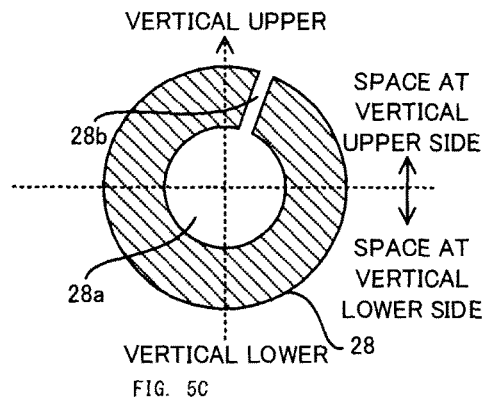
Figure 5D:
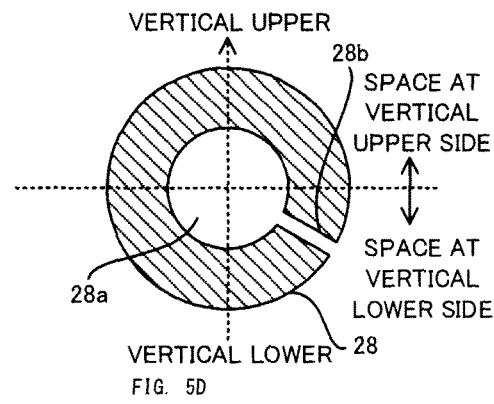

Firstly, as illustrated in FIG. 5C to FIG. 5D, the ECU 11 may determine whether or not the radial hole 28b extends toward a space (spatial region) which is located vertically above the axial center of the communicating hole 28a at the step S13 in FIG. 4. In other words, the ECU 11 may determine whether or not the radial hole 28b extends toward a mechanical portion of the power dividing apparatus 22 which is located vertically above the axial center of the communicating hole 28a. In other words, the ECU 11 may determine whether or not the radial hole 28b extends in a direction from which it is possible to eject the oil to the mechanical portion of the power dividing apparatus 22 which is located vertically above the axial center of the communicating hole 28a.

In this case, as illustrated in FIG. 5C, when it is determined that the radial hole 28b extends toward the space which is located vertically above the axial center of the communicating hole 28a, it may be determined that the oil is appropriately supplied to the power dividing apparatus 22. Therefore, in this case, the ECU 11 does not necessarily adjust the extending direction of the radial hole 28b formed in the input shaft 28. Incidentally, same is true in the case where it is determined that the radial hole 28b extends toward the mechanical portion of the power dividing apparatus 22 which is located vertically above the axial center of the communicating hole 28a. Moreover, same is true in the case where the radial hole 28b extends in the direction from which it is possible to eject the oil to the mechanical portion of the power dividing apparatus 22 which is located vertically above the axial center of the communicating hole 28a.

On the other hand, as illustrated in FIG. 5D, when it is determined that the radial hole 28b does not extend toward the space which is located vertically above the axial center of the communicating hole 28a (in other words, extends toward a space which is located vertically below the axial center of the communicating hole 28a), it may be determined that there is a possibility that the oil is not appropriately supplied to the power dividing apparatus 22. Therefore, in this case, the ECU 11 may adjust the extending direction of the radial hole 28b formed in the input shaft 28. Incidentally, same is true in the case where it is determined that the radial hole 28b does not extend toward the mechanical portion of the power dividing apparatus 22 which is located vertically above the axial center of the communicating hole 28a (in other words, extends toward a mechanical portion of the power dividing apparatus 22 which is located vertically below the axial center of the communicating hole 28a). Moreover, same is true in the case where the radial hole 28b does not extend in the direction from which it is possible to eject the oil to the mechanical portion of the power dividing apparatus 22 which is located vertically above the axial center of the communicating hole 28a (in other words, extends in a direction from which it is possible to eject the oil to the mechanical portion of the power dividing apparatus 22 which is located vertically below the axial center of the communicating hole 28a).

Figure 5E:
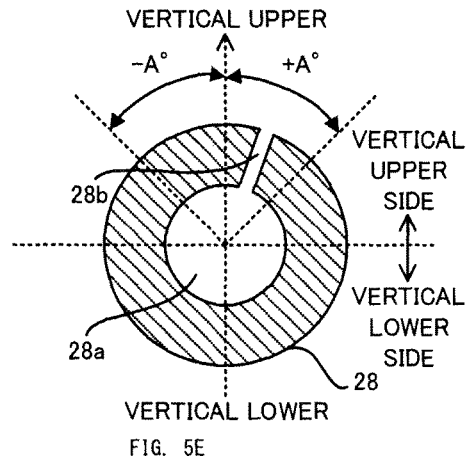
Figure 5F:
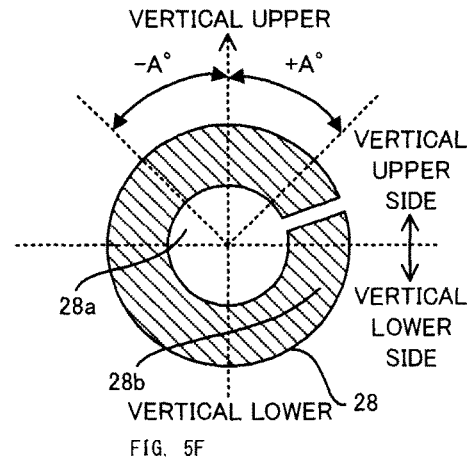

Alternatively, as illustrated in FIG. 5E to FIG. 5F, the ECU 11 may determine whether or not the radial hole 28b extends in a direction which intersects a line extending from the communicating hole 28a to the vertical upper side at an angle which is equal to or more than A degree and is equal to or less than A degree. In other words, the ECU 11 may determine whether or not an angle at which the extending direction of the radial hole 28b and the line extending from the communicating hole 28a to the vertical upper side intersects is in a range which is equal to or more than A degree and is equal to or less than A degree. Incidentally, FIG. 5C and FIG. 5D illustrates the case where A=90 degree.

In this case, as illustrate in FIG. 5E, when it is determined that the radial hole 28b extends in the direction which intersects the line extending from the communicating hole 28a to the vertical upper side at the angle which is equal to or more than −A degree and is equal to or less than A degree, it may be determined that the oil is appropriately supplied to the power dividing apparatus 22. Therefore, in this case, the ECU 11 does not necessarily adjust the extending direction of the radial hole 28b formed in the input shaft 28.

On the other hand, as illustrate in FIG. 5F, when it is determined that the radial hole 28b does not extend in the direction which intersects the line extending from the communicating hole 28a to the vertical upper side at the angle which is equal to or more than −A degree and is equal to or less than A degree, it may be determined that there is a possibility that the oil is not appropriately supplied to the power dividing apparatus 22. Therefore, in this case, the ECU 11 may adjust the extending direction of the radial hole 28b formed in the input shaft 28.

Incidentally, it is preferable that a parameter such as the angle A which is used in FIG. 5E and FIG. 5F be set to an appropriate value such that the oil is appropriately supplied to the power dividing apparatus 22. For example, the angle A may be set to an appropriate value for each hybrid vehicle 1 on the basis of a specification of the electrical oil pump 29, sizes of the communicating hole 28a, the radial hole 28b and each mechanical portion (for example, the sun gear 23S, the pinion gear 23P, the carrier 23C and the ring gear 23R) of the power dividing apparatus 22, a positional relationship between the radial hole 23 and each mechanical portion of the power dividing apparatus 22, viscosity of the oil and the like.

Again in FIG. 4, when it is determined that the radial hole 28b does not extend from the communicating hole 28a to the vertical upper side (step S13: No), the ECU 11 determines whether or not a torque Tp which is transmitted to the propeller shaft 43 is zero or the negative torque (step S14).

As a result of the determination at the step S14, when it is determined that the torque Tp which is transmitted to the propeller shaft 43 is not zero and the negative torque (step S14: No), the torque Tp which is transmitted to the propeller shaft 43 is obviously the positive torque. In this case, the motor generator MG1 probably outputs the negative torque Tg and this negative torque Tg is probably transmitted as the positive torque Tg*1/ρ to the propeller shaft 43, as described above, because the hybrid vehicle 1 drives (especially, power-runs) in the MG1/2 dual drive traveling mode. Therefore, in this case, even if the engine 21 stops, the negative torque Tg which is outputted from the motor generator MG1 allows the input shaft 28 to rotate. Therefore, the ECU 11 does not necessarily adjust the extending direction of the radial hole 28b formed in the input shaft 28. Thus, the ECU 11 finishes the operation illustrated in FIG. 4. Then, the ECU 11 may perform the operation illustrated in FIG. 4 periodically or non-periodically.

On the other hand, as a result of the determination at the step S14, when it is determined that the torque Tp which is transmitted to the propeller shaft 43 is zero or the negative torque (step S14: Yes), there is a high possibility that the motor generator MG1 does not output the negative torque Tg, because the hybrid vehicle 1 drives in the MG1/2 dual drive traveling mode. This is because there is a high possibility that the hybrid vehicle 1 decelerates (for example, decelerates by using a friction brake or decelerates by using a regeneration brake) or stops when the torque Tp which is transmitted to the propeller shaft 43 is zero or the negative torque. Thus, there is relatively small need for the motor generator MG1 to output the negative torque Tg (namely, a torque which is transmitted as the positive torque to the propeller shaft 43, and a torque which acts to prevent the deceleration of the hybrid vehicle 1), when the hybrid vehicle 1 decelerates. Alternatively, there is a high possibility that a torque which is required by the hybrid vehicle 1 is satisfied without using the negative torque Tg which is outputted from the motor generator MG1, when the hybrid vehicle 1 stops. Thus, when it is determined that the torque Tp which is transmitted to the propeller shaft 43 is zero or the negative torque, the motor generator MG1 does not output the negative torque Tg and thus the input shaft 43 does not rotate. Namely, the extending direction of the radial hole 28b, which does not extend from the communicating hole 28a to the vertical upper side, is fixed.

Therefore, when it is determined that the torque Tp which is transmitted to the propeller shaft 43 is zero or the negative torque, the ECU 11 adjusts the extending direction of the radial hole 28b formed in the input shaft 28 (step S15).

Here, with reference to FIG. 6 as well as FIG. 4, an operation of adjusting the extending direction of the radial hole 28b will be explained with a nomogram which illustrates the operational state of the hybrid drive apparatus 10. FIG. 6 is a nomogram illustrating the operational state of the hybrid drive apparatus 10 when the extending direction of the radial hole 28b. Incidentally, FIG. 6 associates a horizontal axis with the motor generator MG1 (the sun gear 23S), the engine (ENG) 21 (the carrier 23C) and the propeller shaft (OUT) 43 and associates a vertical axis with their rotation number.

Firstly, the ECU 11 controls the motor generator MG1 such that the motor generator MG1 outputs the negative torque Tg until the radial hole 28b extends (gets to extend) from the communicating hole 28a to the vertical upper side. However, the ECU 11 may control the motor generator MG1 such that the motor generator MG1 outputs the negative torque Tg until the radial hole 28b extends toward the space which is located vertically above the axial center of the communicating hole 28a (see FIG. 3C). Alternatively, the ECU 11 may control the motor generator MG1 such that the motor generator MG1 outputs the negative torque Tg until the radial hole 28b extends in the direction which intersects the line extending from the communicating hole 28a to the vertical upper side at the angle which is equal to or more than −A degree and is equal to or less than A degree (see FIG. 3E).

In this case, a torque which is capable of rotating the input shaft 28 in the negative direction is enough as the negative torque Tg which is outputted from the motor generator MG1. Therefore, the ECU 11 sets the negative torque Tg which is outputted from the motor generator MG1 to a minimum torque Tgmin of the motor generator MG1 (see the motor generator MG1 (the sun gear 23S) illustrated in a left part of FIG. 6). As a result, the motor generator MG1 outputs the negative torque Tg (=Tgmin).

In this case, the negative torque Tg which is outputted from the motor generator MG1 is transmitted as the negative torque to the input shaft 28 via the power dividing apparatus 22. Therefore, the input shaft 28 skids against the crank shaft 26 (in other words, rotates in the negative direction to the fixed crank shaft 26), as with the explanation of the above described MG1/2 dual drive traveling mode. Thus, the ECU 11 is capable of rotating the input shaft 28 (see a white circle on the axis of the engine (ENG) 21 (the carrier 23C) illustrated in a center part of FIG. 6) without rotating the crank shaft 26 which stops at the desired crank angle (see a black circle on the axis of the engine (ENG) 21 (the carrier 23C) illustrated in the center part of FIG. 6). Namely, when the motor generator MG1 outputs the negative torque Tg (=Tgmin) in order to adjust the extending direction of the radial hole 28b, the state of the hybrid drive apparatus 22 is changed from a state which is illustrated by a dotted line to a state which is illustrated by a solid line in the nomogram. As a result, the ECU 11 is capable of adjusting the extending direction of the radial hole 28a to appropriately supply the oil to the power dividing apparatus 22 while stopping the engine 21 (furthermore, without rotating the crank shaft 26 which stops at the desired crank angle.

Moreover, the negative torque Tg (=Tgmin) which is outputted from the motor generator MG1 is transmitted as the positive torque $Tg*1/\rho$ (=$Tgmin*1/\rho$) to the propeller shaft 43 of the hybrid vehicle 1 via the power dividing apparatus 22 and the reduction gear 36. The positive torque $Tg*1/\rho$(=$Tgmin*1/\rho$) may cause a deterioration of a ride quality, because the positive torque $Tg*1/\rho$(=$Tgmin*1/p$) is not a torque which is essentially necessary for driving the hybrid vehicle 1. Therefore, the ECU 11 adjusts the positive torque Tm which is outputted from the motor generator MG2, in order to cancel out the influence of the negative torque Tg (=Tgmin) which is outputted from the motor generator MG1 on the propeller shaft 43. Specifically, the ECU 11 sets the positive torque Tm which is outputted from the motor generator MG2 to a torque (namely, $(Tp-Tg*1/\rho)/Rm$=$(Tp-Tgmin*1/\rho)/Rm$) which is obtained by subtracting the torque $Tg*1/\rho$ (=$Tgmin*1/\rho$) which is transmitted from the motor generator MG1 to the propeller shaft 43 when the operation at the step S15 in FIG. 4 is performed from the torque Tp which is transmitted to the propeller shaft 43 at the timing immediately before the operation at the step S15 in FIG. 4 is performed and then reflecting the reduction of the subtracted torque due to the reduction gear 36. As a result, the positive torque Tm (=$(Tp-Tgmin*1/\rho)/Rm$) which is outputted from the motor generator MG2 is transmitted as the positive torque $Tm*Rm$ (=$Tp-Tgmin*1/\rho$) to the propeller shaft 43. As a result, the torque which is transmitted to the propeller shaft 43 becomes Tp (see the axis of the propeller shaft (OUT) 43 illustrated in a right part of FIG. 6). Therefore, the deterioration of the ride quality is prevented.

As described above, the hybrid vehicle 1 of the present embodiment is capable of the extending direction of the radial hole 28b to appropriately supply the oil to the power dividing apparatus 22 while stopping the engine 21 (furthermore, without rotating the crank shaft 26 which stops at the desired crank angle). Thus, even if the engine 21 stops, the oil can be appropriately supplied to the power dividing apparatus 22.

Especially, even if the rotation numbers of the sun gear 23S, the carrier 23C and the ring gear 23R are small, the oil is supplied to each mechanism portion of the power dividing apparatus 22 by using an effect of a free fall, which is caused by the gravity acceleration, of the oil which is ejected from the radial hole 28b to the vertical upper side. Therefore, the oil is appropriately supplied to the power dividing apparatus 22, regardless of the rotation numbers of the sun gear 23S, the carrier 23C and the ring gear 23R. However, it is needless to say that the oil is supplied to the entire power dividing apparatus 22 more easily as the rotation numbers of the sun gear 23S, the carrier 23C and the ring gear 23R become larger.

In addition, the hybrid vehicle 1 of the present embodiment is capable of adjusting the extending direction of the radial hole 28b by rotating the input shaft 28 without rotating the crank shaft 26. Therefore, a technical effect (for example, such a technical effect that the vibration is minimized when the engine is restarted, as described above) which is realized by the crank shaft 26 which stops at the desired crank angle is hardly or never prevented, even if the extending direction of the radial hole 28b is adjusted.

In addition, when the hybrid vehicle 1 drives in the MG1/2 dual drive traveling mode, the torque Tg which is outputted from the motor generator MG1 is transmitted from the sun gear 23S to the pinion gear 23P which engages with the sun gear 23S. Thus, when the hybrid vehicle 1 drives in the MG1/2 dual drive traveling mode, there is likely the shortage of lubricating performance for the power dividing apparatus 22 (especially, the shortage of the lubricating performance for the pinion gear 23P), because a pressure at a surface between the sun gear 23S and the pinion gear 23P or the like is larger than that in the case where the hybrid vehicle 1 does not drive in the MG1/2 dual drive traveling mode. Even in this case, the hybrid vehicle 1 of the present embodiment is capable of appropriately supplying to the power dividing apparatus 22. Therefore, even if the hybrid vehicle 1 drives in the MG1/2 dual drive traveling mode by which there is likely the shortage of the lubricating performance, such a practically useful effect that there is unlikely the shortage of the lubricating performance for the power dividing apparatus 22 (especially, the lubricating performance for the pinion gear 23P) can be obtained.

Incidentally, the oil can be appropriately supplied to the power dividing apparatus 22 by increasing the output of the electrical oil pump 29 which supplies the oil to the communicating hole 28a and the radial hole 28b, even if the input shaft 28 stops under the condition where the radial hole 28b does not extend from the communicating hole 28a to the vertical upper side. However, the increase of the output of the electrical oil pump 29 results in an increase of a consumption power and a size of the electrical pump 29 and thus is not always preferable. On the other hand, the present embodiment is practically very useful, because the oil can be appropriately supplied to the power dividing apparatus 22 without the increase of the output of the electrical oil pump 29.

Incidentally, the above described explanation illustrates an example in which the hybrid vehicle 1 which stops the engine 21 drives in the MG1/2 dual drive traveling mode. However, the hybrid vehicle 1 which stops the engine 21 may drive in MG2 single drive traveling mode by which only the torque outputted from the motor generator MG2 is used for the drive. In the MG2 single drive traveling mode, the motor generator MG1 does not output the torque, because the motor generator MG1 merely idles. However, the motor generator MG1 sometimes output small torque which suppresses gear rattle of the sun gear 23.

When the hybrid vehicle 1 drives in the MG2 single drive traveling mode, the input shaft 28 hardly or never rotates, because the engine 21 stops and the motor generator MG1 hardly or never outputs the torque. Therefore, even when the hybrid vehicle 1 drives in the MG2 single drive traveling mode, the operation after the step S13 in FIG. 4 (namely, such an operation that the motor generator MG1 outputs the negative torque until the radial hole 28*b* extends from the communicating hole 28*a* to the vertical upper side) may be performed.

However, when the hybrid vehicle 1 drives in the MG2 single drive traveling mode, the pressure at the surface between the sun gear 23S and the pinion gear 23P is hardly or never large, because the motor generator MG1 hardly or never outputs the torque. Therefore, when the hybrid vehicle 1 drives in the MG2 single drive traveling mode, there is unlikely the shortage of lubricating performance for the power dividing apparatus 22 (especially, the shortage of the lubricating performance for the pinion gear 23P), compared to the case where the hybrid vehicle 1 drives in the MG1/2 dual drive traveling mode. Therefore, the technical effect of preventing the shortage of the lubricating performance, which is obtained by supplying the oil to the power dividing apparatus 22 by performing the above described control, is greater in the case where the hybrid vehicle 1 drives in the MG1/2 dual drive traveling mode than in the case where the hybrid vehicle 1 drives in the MG2 single drive traveling mode. However, it is needless to say that the oil can be supplied to the power dividing apparatus 22 by performing the above described control even if the hybrid vehicle 1 drives in the MG2 single drive traveling mode Incidentally, according to the flowchart which is illustrated in FIG. 4, when the engine 21 is required to stop, the engine 21 stops and the motor generator MG1 outputs the negative torque until the radial hole 28*b* extends from the communicating hole 28*a* to the vertical upper side. Namely, the flowchart which is illustrated in FIG. 4 illustrates a flow of the operation which is performed when the engine 21 is driven. However, the operation after the step S13 in FIG. 4 (namely, such an operation that the motor generator MG1 outputs the negative torque until the radial hole 28*b* extends from the communicating hole 28*a* to the vertical upper side) may be performed under the condition where the engine 21 already stops.

For example, the hybrid vehicle 1 often performs an EV traveling which uses at least one of the motor generators MG1 and MG2, when it starts to travel in a stopping state. Therefore, in this case, the operation after the step S13 in FIG. 4 (namely, such an operation that the motor generator MG1 outputs the negative torque until the radial hole 28*b* extends from the communicating hole 28*a* to the vertical upper side) may be performed after, before or in parallel with the start of the traveling.

Alternatively, there is a possibility that the radial hole 28*b* becomes not to extend from the communicating hole 28*a* to the vertical upper side for some reason in the hybrid vehicle 1 which already performs the EV traveling. For example, when the traveling mode of the hybrid vehicle 1 is changed from the MG1/2 dual drive traveling mode to the MG2 single drive traveling mode, the motor generator MG1 does not output the torque sometimes, while the engine 21 is kept to be driven. In this case, the operation illustrated in the flowchart of FIG. 4 is not performed because the engine 21 does not stop, and the input shaft 28 stops rotating because the motor generator MG1 does not necessarily output the torque. Therefore, there is a possibility that the input shaft 28 stops rotating under the condition where the radial hole 28*b* does not extend from the communicating hole 28*a* to the vertical upper side while the engine 21 is kept to be driven, in some cases. Therefore, in this case, the operation after the step S13 in FIG. 4 (namely, such an operation that the motor generator MG1 outputs the negative torque until the radial hole 28*b* extends from the communicating hole 28*a* to the vertical upper side) may be performed after, before or in parallel with the change of the traveling mode of the hybrid vehicle 1 from the MG1/2 dual drive traveling mode to the MG2 single drive traveling mode. Alternatively, it is preferable that the ECU 11 appropriately monitor whether or not the radial hole 28*b* extend from the communicating hole 28*a* to the vertical upper side, even if the hybrid vehicle 1 drives in the EV traveling mode. In this case, when it is determined that the radial hole 28*b* does not extend from the communicating hole 28*a* to the vertical upper side, it is preferable that the motor generator MG1 output the negative torque until the radial hole 28*b* extends from the communicating hole 28*a* to the vertical upper side.

Incidentally, it is preferable that the engine 21 be assembled (namely, the crank shaft 26 and the input shaft 28 be assembled) such that a target value of the crank angle at the timing when the engine 21 stops (namely, the desired crank angle) is same as the rotational angle of the input shaft 28 under the condition where the radial hole 28*b* extends from the communicating hole 28*a* to the vertical upper side, from a viewpoint of reducing a frequency of adjusting the extending direction of the radial hole 28*b*. The assembly of the engine 21 in this manner allows the input shaft 28 to stop under the condition where the radial hole 28*b* extends from the communicating hole 28*a* to the vertical upper side when the engine 21 stops. Therefore, the ECU 11 does not necessarily adjust the extending direction of the radial hole 28*b* actively (namely, the motor generator MG1 is not necessarily driven), a power consumption of the battery 13 can be reduced.

However, it is anticipated that the state where the target value of the crank angle at the timing when the engine 21 stops (namely, the desired crank angle) is different from the rotational angle of the input shaft 28 under the condition where the radial hole 28*b* extends from the communicating hole 28*a* to the vertical upper side arises for some reason. Such a state arises when the input shaft 28 skids against the crank shaft 26 by the function of the above described damper apparatus 27 with the torque limiter, for example. However, in this case, the fact remains that the oil can be appropriately supplied to the power dividing apparatus 22, because the ECU 11 adjusts the extending direction of the radial hole 28*b*.

Moreover, single radial hole 28*b* may be formed in the input shaft 28. In this case, the operation of controlling the hybrid drive apparatus 10 (especially, the control operation which is related to the supply of the oil to the power dividing apparatus 22) which is performed by the ECU 11 is already explained by using FIG. 4 and FIG. 5.

Alternatively, a plurality of radial holes 28*b* may be formed in the input shaft 28. In this case, the ECU 11 preferably determines whether or not at least one of the plurality of radial holes 28*b* extends from the communicating hole 28*a* to the vertical upper side at the step S13 in FIG. 4. When it is determined that at least one of the plurality of radial holes 28*b* extends from the communicating hole 28*a* to the vertical upper side (step S13: Yes), the ECU 11 does not necessarily adjust the extending directions of the plurality of radial hole 28*b* formed in the input shaft 28. On the other hand, when it is determined that all of the plurality of radial holes 28*b* do not extend from the communicating hole 28*a* to the vertical upper side (step S13: No), the ECU 11 preferably adjusts the extending directions of the plurality of radial hole 28*b* formed in the input shaft 28.

For example, as illustrated in FIG. 7A to FIG. 7F, an example in which three radial holes 28*b* are formed in the input shaft 28 will be explained. Specifically, an example in which three radial holes 28*b* are respectively formed at positions at which the rotational angles of the input shaft 28 are respectively 0 degree, 120 degree and 240 degree will be explained.

Figure 7A:
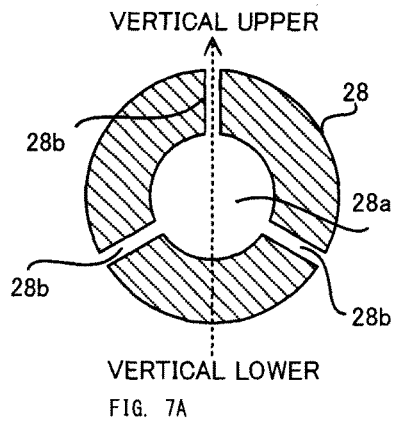
FIGS. 7A, 7B, 7C, 7D, and 7E are cross sectional diagrams each of which illustrates a cross sectional surface of one portion of the input shaft at which the radial hole is formed which is perpendicular to the axial center of the input shaft.

As illustrated in FIG. 7A, when at least one radial hole 28b of three radial holes 28b extends from the communicating hole 28a to the vertical upper side, the oil is appropriately supplied to the power dividing apparatus 22, as described above. Therefore, in this case, the ECU 11 does not necessarily adjust the extending directions of three radial holes 28b formed in the input shaft 28.

Figure 7B:
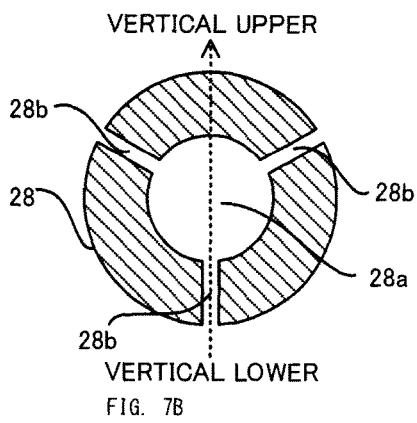

On the other hand, as illustrated in FIG. 7B, when all of three radial holes 28b does not extend from the communicating hole 28a to the vertical upper side, there is a possibility that the oil is not appropriately supplied to the power dividing apparatus 22, as described above. Therefore, in this case, it is preferable that the ECU 11 adjust the extending directions of three radial holes 28b formed in the input shaft 28.

Figure 7C:
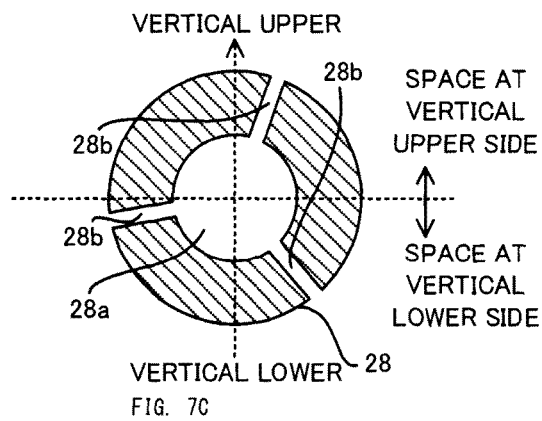

Alternatively, as illustrated in FIG. 7C, when it is determined that at least one radial hole 28b of three radial holes 28b extends toward the space which is located vertically above the axial center of the communicating hole 28a, it may be determined that the oil is appropriately supplied to the power dividing apparatus 22. Therefore, in this case, the ECU 11 does not necessarily adjust the extending direction of three radial holes 28b formed in the input shaft 28.

Incidentally, when three radial holes 28b are respectively formed at positions at which the rotational angles of the input shaft 28 are respectively 0 degree, 120 degree and 240 degree, there is substantially no chance that it is determined that all of three radial holes 28b do not extend toward the space which is located vertically above the axial center of the communicating hole 28a.

Figure 7D:
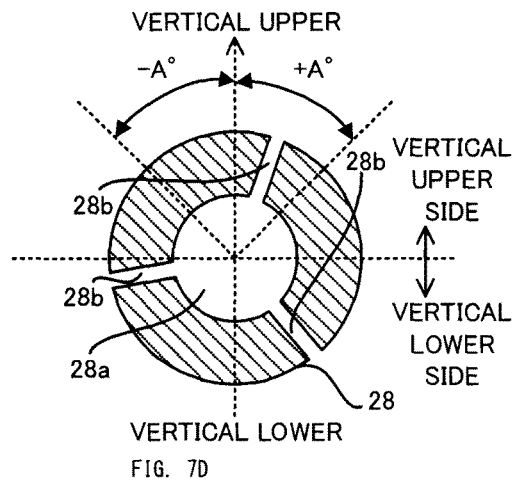

Alternatively, as illustrated in FIG. 7D, when it is determined that at least one of three radial holes 28b extends in the direction which intersects the line extending from the communicating hole 28a to the vertical upper side at the angle which is equal to or more than −A degree and is equal to or less than A degree, it may be determined that the oil is appropriately supplied to the power dividing apparatus 22. Therefore, in this case, the ECU 11 does not necessarily adjust the extending directions of three radial hole 28b formed in the input shaft 28.

Figure 7E:
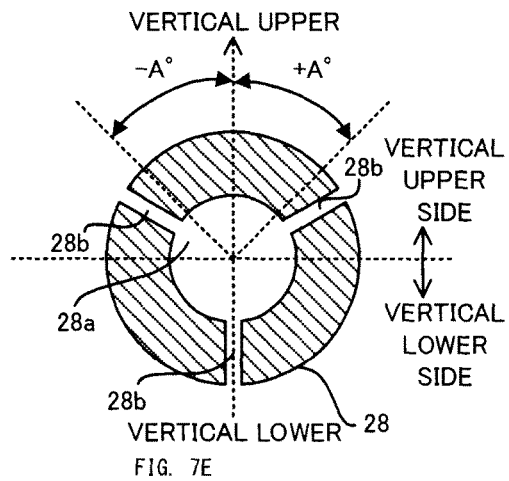

On the other hand, as illustrated in FIG. 7E, when it is determined that all of three radial holes 28b do not extend in the direction which intersects the line extending from the communicating hole 28a to the vertical upper side at the angle which is equal to or more than −A degree and is equal to or less than A degree, it may be determined that the oil is appropriately supplied to the power dividing apparatus 22. Therefore, in this case, it is preferable that the ECU 11 adjusts the extending directions of three radial hole 28b formed in the input shaft 28.

The present invention can be modified without departing from the essence or spirit of the invention which can be read from the claims and the entire specification. A control apparatus for a hybrid vehicle, which involves such modification, is also intended to be within the technical scope of the present invention.

REFERENCE SIGNS LIST

1 hybrid vehicle
11 hybrid drive apparatus
21 engine
22 power dividing apparatus
23S sun gear
23P pinion gear
23C carrier
23R ring gear
24 one-way clutch
26 crank shaft
27 damper apparatus with torque limiter
28 input shaft
28a communicating hole
28b radial hole
29 electrical oil pump
36 reduction gear
46 propeller shaft
MG1 motor generator
MG2 motor generator

The invention claimed is:

1. A control apparatus for a hybrid vehicle for controlling the hybrid vehicle,
the hybrid vehicle comprising:
an internal combustion engine;
a first rotating electrical machine;
a second rotating electrical machine whose output shaft is coupled to a drive shaft of the hybrid vehicle;
a planetary gear train including (i-1) a first gear which is coupled to an output shaft of the first rotating electrical machine, (i-2) a carrier which is coupled to an input shaft, the input shaft being coupled to an engine shaft of the internal combustion engine, the input shaft being coupled to the engine shaft via a torque limiter which allows the input shaft to skid against the engine shaft depending on a variation of a torque between the input shaft and the engine shaft, and (i-3) a second gear which is coupled to the drive shaft, (ii) the first gear, the carrier, and the second gear being capable of differentially rotating with one another; and
a one-way clutch which allows the engine shaft to rotate in one direction and prevents the engine shaft from rotating in another direction which is different from the one direction,
the input shaft having:
(i) a supply passage which is formed in the input shaft to supply lubricating oil for keeping a lubrication of the planetary gear train and which extends in an axial direction of the input shaft; and
(ii) an ejecting hole which is formed in the input shaft to eject the lubricating oil, which is supplied via the supply passage, to an outside of the input shaft and which extends from the supply passage to the outside of the input shaft,
the control apparatus for the hybrid vehicle comprising a controller,
the controller being configured to:
determine whether or not the ejecting hole with the internal combustion engine stopped extends in a predetermined direction in which the ejecting hole is capable of ejecting the lubricating oil to at least one of the first gear, the carrier, and the second gear of the planetary gear train which is radially outward of the input shaft; and
drive the first rotating electrical machine such that a predetermined torque which acts to rotate the input shaft in the another direction is outputted from the first rotating electrical machine until the ejecting hole extends in the predetermined direction, when it is determined that the ejecting hole does not extend in the predetermined direction under a state where the internal combustion engine stops.

2. The control apparatus for the hybrid vehicle according to claim 1, wherein
the controller is configured to drive the first rotating electrical machine such that the predetermined torque is outputted from the first rotating electrical machine until the ejecting hole extends in the predetermined direction, when the hybrid vehicle drives in a dual drive traveling mode by which the hybrid vehicle drives by using both of a first torque which is outputted from the first electrical rotating machine and a second torque which is outputted from the second electrical rotating machine under the state where the internal combustion engine stops.

3. The control apparatus for the hybrid vehicle according to claim 2, wherein
the controller is configured to drive the first rotating electrical machine such that the predetermined torque is outputted from the first rotating electrical machine until the ejecting hole extends in the predetermined direction, when the hybrid vehicle which drives in the dual drive traveling mode stops or decelerates.

4. The control apparatus for the hybrid vehicle according to claim 1, wherein
the internal combustion engine and the planetary gear train are assembled such that a target value of a rotational angle of the engine shaft at a timing when the engine shaft stops rotating due to the stop of the internal combustion engine is the same as a rotational angle of the input shaft with the ejecting hole extending in the predetermined direction.

* * * * *